US012801082B2

(12) United States Patent
Chino

(10) Patent No.: US 12,801,082 B2
(45) Date of Patent: Nov. 17, 2026

(54) IMAGE FORMING APPARATUS

(71) Applicant: CANON KABUSHIKI KAISHA, Tokyo (JP)

(72) Inventor: Hideto Chino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/891,698

(22) Filed: Sep. 20, 2024

(65) Prior Publication Data

US 2025/0102994 A1 Mar. 27, 2025

(30) Foreign Application Priority Data

Sep. 27, 2023 (JP) ................................ 2023-166495

(51) Int. Cl.
*G03G 21/16* (2006.01)
*G03G 15/00* (2006.01)
*G03G 21/18* (2006.01)

(52) U.S. Cl.
CPC ..... *G03G 21/1633* (2013.01); *G03G 15/6511* (2013.01); *G03G 21/1846* (2013.01); *G03G 2215/00421* (2013.01); *G03G 2221/1846* (2013.01)

(58) Field of Classification Search
CPC ........... G03G 21/1842; G03G 21/1676; G03G 21/1647; G03G 21/1821; G03G 21/1633
See application file for complete search history.

(56) References Cited

U.S. PATENT DOCUMENTS 11,281,152 B1 * 3/2022 Kokubu ............ G03G 21/1633
2005/0141947 A1 6/2005 Nishimura
2011/0280999 A1 * 11/2011 Crystal ............... A21C 15/002 426/302
2014/0369713 A1 * 12/2014 Nakao ............... G03G 21/1633 399/107
2017/0248211 A1 8/2017 Chino
2018/0195560 A1 7/2018 Chino
2019/0302688 A1 * 10/2019 Abe .................. G03G 21/1864
2020/0409288 A1 * 12/2020 Kumagai .............. G03G 15/55
2021/0003945 A1 1/2021 Chino

FOREIGN PATENT DOCUMENTS

JP 2005-195704 7/2005

* cited by examiner

*Primary Examiner* — Jessica L Eley
(74) *Attorney, Agent, or Firm* — Venable LLP

(57) ABSTRACT

Provided is an image forming apparatus, including a main body capable of attaching a cartridge thereto. The main body includes: a housing provided with an opening for allowing the cartridge to pass therethrough; and an opening/closing member capable of moving between a closed position and an open position. The opening/closing member includes a first cover portion that is opposed to an end surface of the cartridge on an upstream side in an attaching direction and a second cover portion that is opposed to a top surface of the cartridge on the upstream side when the opening/closing member is located at the closed position. The opening/closing member moves to the open position by rotating downward about a rotation axis provided at a lower end of the first cover portion when the opening/closing member is located at the closed position.

11 Claims, 12 Drawing Sheets

IMAGE FORMING APPARATUS

BACKGROUND OF THE INVENTION

Field of the Invention

The present invention relates to an image forming apparatus.

Description of the Related Art

Conventionally, in image forming apparatus such as copying machines and printers, which use an electrophotographic system or an electrostatic recording system, a process cartridge obtained by integrating a photosensitive drum as an image bearing member and a developing unit is detachably attached to an apparatus main body.

For example, in an image forming apparatus, in order to secure the visibility and accessibility of a process cartridge that is inside the apparatus for the purpose of facilitating the detaching/attaching operation, a large opening is provided extending from a side surface side to a top surface side at the time of installation of the apparatus. In such an image forming apparatus, by an openable and closable opening/closing cover that corresponds to the opening, two surfaces on the side surface side and the top surface side need to be covered.

Japanese Patent Application Publication No. 2005-195704 discloses an example of such an opening/closing cover. As such an opening/closing cover, in general, the opening/closing cover can rotate about a single rotation shaft, and a surface covering the front side and a surface covering the top surface side are integrally formed. Furthermore, Japanese Patent Application Publication No. 2005-195704 discloses a configuration in which a member that covers the front surface side and a member that covers the top surface side in the opening/closing cover are formed by separate components, and the components are installed swingably relative to each other. In the opening/closing cover, the cover on the top surface side is biased by a spring in a product internal direction, and an angle formed by the cover on the front side and the cover on the top surface side in the state, in which the opening/closing cover is open, becomes smaller than in the state, in which the opening/closing cover is closed.

SUMMARY OF THE INVENTION

However, in the configuration of the opening/closing cover in which the surface that covers the front side and the surface that covers the top surface side are integrated, in the case of detaching or attaching a cartridge such as a process cartridge, a toner cartridge, and a developing cartridge, by opening the opening/closing cover is opened, the cover on the top surface side is located near a detaching/attaching operation region, hence an operation space is narrow. Thus, it is difficult for a hand of an operator to hold a gripping portion of the cartridge.

Furthermore, in the configuration of the opening/closing cover in which the surface that covers the front side and the surface that covers the top surface side can swing relative to each other, in a process for closing the opening/closing cover, the cover on the top surface side that has been biased and swung in the apparatus internal direction needs to be pushed back to a normal posture. Thus, it is difficult to set a swinging amount large in the state in which the opening/closing cover is open. Accordingly, it is difficult to sufficiently retreat the cover on the top surface side from a detaching/attaching locus of the process cartridge, and similarly to the former configuration of the integral opening/closing cover, the detaching/attaching operability of the cartridge decreases.

The present invention has been made in view of the above-mentioned problems. It is an object of the present invention to improve the operability for detaching/attaching in regard to an opening/closing cover provided to an opening for attaching and detaching a cartridge to and from a main body of an image forming apparatus.

The present invention provides an image forming apparatus, comprising:

- a cartridge; and
- an apparatus main body to which the cartridge is attachable in an attaching direction,
- wherein the apparatus main body includes:
  - a housing provided with an opening through which the cartridge passes when the cartridge is attached to the apparatus main body; and
  - an opening/closing member configured to move, with respect to the housing, between a closed position in which the opening/closing member closes the opening and an open position in which the opening/closing member opens the opening,
- wherein the opening/closing member includes a first cover portion which is opposed to an end surface of the cartridge on an upstream side in the attaching direction to cover the end surface of the cartridge when the opening/closing member is located at the closed position and a second cover portion which is opposed to a top surface of the cartridge on the upstream side to cover the top surface of the cartridge when the opening/closing member is located at the closed position,
- the opening/closing member is moved from the closed position to the open position by being rotated downward about a rotation axis provided at a lower end part of the first cover portion when the opening/closing member is located at the closed position, and
- the second cover portion is configured to slide with respect to the first cover portion.

The present invention also provides an image forming apparatus, comprising:

- a cartridge; and
- an apparatus main body to which the cartridge is attached in an attaching direction,
- wherein the apparatus main body includes:
  - a housing provided with an opening through which the cartridge passes when the cartridge is attached to the apparatus main body; and
  - an opening/closing member is configured to move, with respect to the housing, between a closed position in which the opening/closing member closes the opening and an open position in which the opening/closing member opens the opening,
- wherein the opening/closing member includes a first cover portion which is opposed to an end surface of the cartridge on an upstream side in the attaching direction to cover the end surface of the cartridge when the opening/closing member is located at the closed position and a second cover portion which is opposed to a top surface of the cartridge on the upstream side to cover the top surface of the cartridge when the opening/closing member is located at the closed position,
- the opening/closing member is moved from the closed position to the open position by being rotated in a first rotation direction downward about a first rotation axis provided at a lower end part of the first cover portion when the opening/closing member is located at the closed position, and in a case where a posture of the second cover portion with respect to the first cover portion, when the opening/closing member is located at the closed position and the second cover portion is opposed to the top surface of the cartridge, is a first posture, the second cover portion is configured to be transitioned to a second posture from the first posture by being rotated, with respect to the first cover portion, in the first rotation direction about a second rotation axis extending in a direction of the first rotation axis.

According to the present invention, in regard to the opening/closing cover provided to an opening for attaching and detaching a cartridge to and from the main body of the image forming apparatus, the operability for detaching/attaching can be improved.

Further features of the present invention will become apparent from the following description of exemplary embodiments with reference to the attached drawings.

DESCRIPTION OF THE EMBODIMENTS

Now, exemplary modes for embodying the present invention are described below with reference to the drawings. However, the dimensions, materials, shapes, and relative arrangements of components described in the embodiments are not intended to limit the scope of the present invention to only the ones unless otherwise described. In the following description, the materials and shapes of members described once are the same in the subsequent description as in the first description unless otherwise described again. For configurations and steps that are not particularly illustrated or described, well-known technologies or publicly known technologies in the technical field can be applied. Overlapping descriptions are sometimes omitted.

Image Forming Apparatus

Figure 1A:
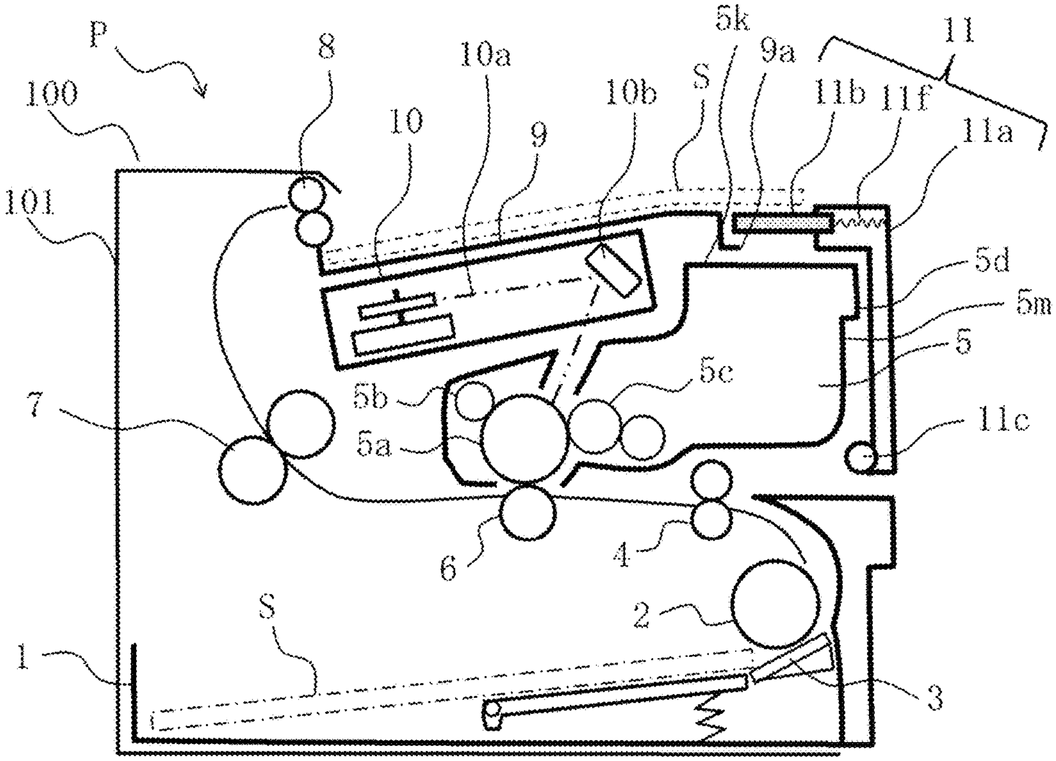
FIGS. 1A and 1B are a cross-sectional view and a perspective view of a printer in a state in which an opening/closing cover is closed in a first embodiment.
Figure 1B:
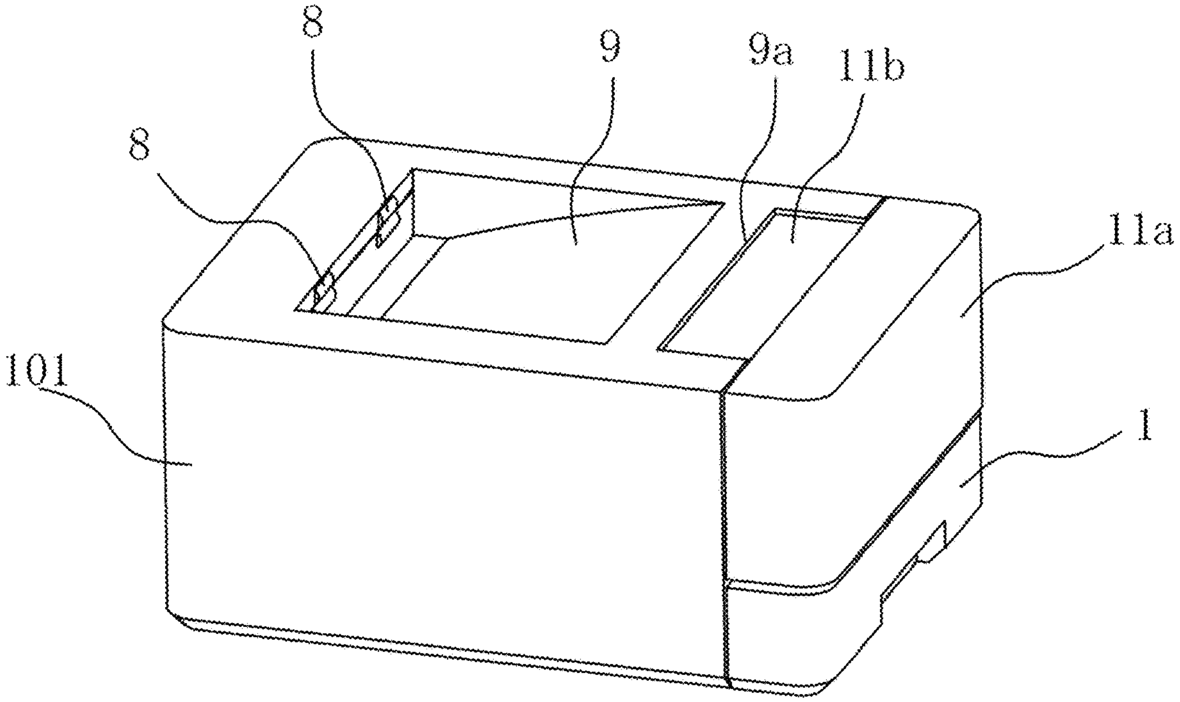

First, a printer P as an image forming apparatus to which an embodiment of the present invention is applied is described. Referring to FIGS. 1A and 1B, a schematic configuration of the image forming apparatus in the present embodiment is described.

FIG. 1A is a schematic cross-sectional view illustrating an overall configuration of an electrophotographic monochrome laser beam printer (hereinafter referred to as "printer P") including an image forming unit for forming a toner image. FIG. 1B is a perspective view of the printer P.

As illustrated in FIGS. 1A and 1B, the printer P includes a cassette 1 (second sheet stacking unit) that is detachably mountable to an apparatus main body 100 on the apparatus front side, which is the right side in the drawings. Sheet materials S, which are housed in the cassette 1 as recording materials on which images are to be formed, are separated and fed one by one by a feed roller 2 and a separation pad 3 that is in pressure contact with the feed roller 2. The separated sheet material S is supplied by a transport roller pair 4 to a nip portion between a photosensitive drum 5*a* and a transfer roller 6 provided in a transport path, and after a toner image corresponding to image information formed on the photosensitive drum 5*a* is transferred to the sheet material S by the transfer roller 6, the sheet material S is transported to a fixing roller pair 7.

When the sheet material S has been transported to the fixing roller pair 7 as toner fixing unit, and when the sheet material S passes through a nip portion of the fixing roller pair 7, a toner image transferred on the surface of the sheet material S is heated, pressurized, and fixed to the sheet material S. After that, the sheet material S is discharged to a sheet material stacking unit 9, which is a stacking unit for stacking sheet materials therein and is provided at a top surface part of the printer P, through the discharge roller pair 8 while the toner image surface is directed downward, and then an image forming operation is finished.

A process cartridge 5 is integrally incorporated therein together with the photosensitive drum 5*a*, a charging roller 5*b*, a developing roller 5*c*, and the like, and is detachably mountable to the apparatus main body 100.

In an image forming step, the surface of the photosensitive drum 5*a*, which is an image bearing member having a photosensitive layer on its surface, is uniformly charged by the charging roller 5*b*. Next, laser light corresponding to image information from a laser scanner 10 is reflected by a reflection mirror 10*b* through a laser optical path 10*a*, and the surface of the photosensitive drum 5*a* is applied with and exposed to the laser light such that an electrostatic latent image is formed thereon. The electrostatic latent image is developed with toner and visualized by the developing roller 5*c*.

First Embodiment

1-(1) Open/Close Cover

Figure 2A:
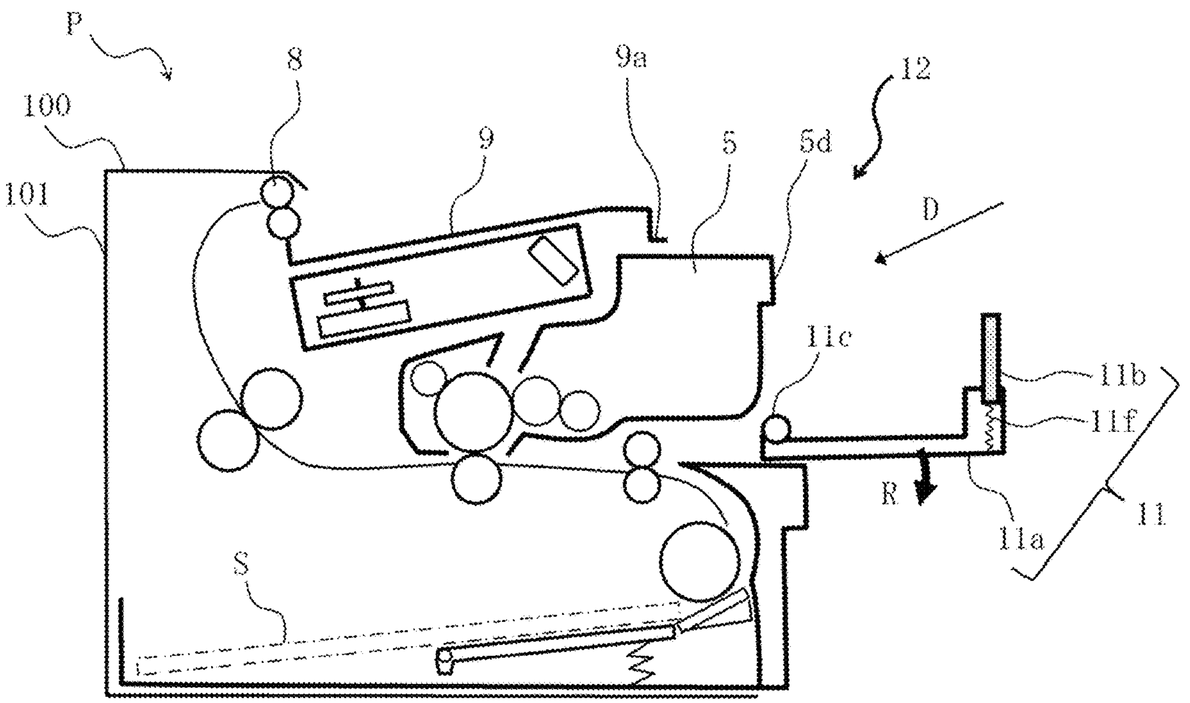
FIGS. 2A and 2B are a cross-sectional view and a perspective view of the printer in which the opening/closing cover is open in the first embodiment.
Figure 2B:
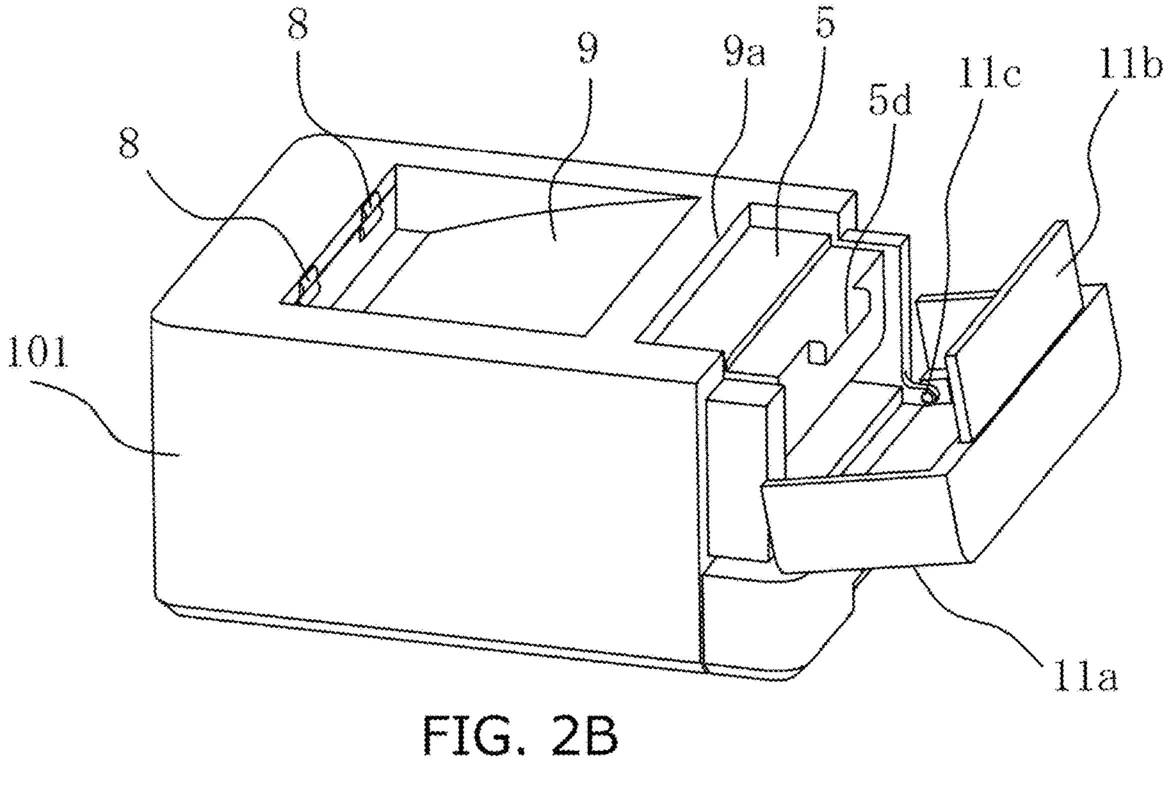

Next, an opening/closing cover 11 as an opening/closing member to which the present invention is applied is described with reference to FIGS. 1A and 1B and FIGS. 2A and 2B. FIGS. 1A and 1B illustrate a state in which the opening/closing cover 11 of the printer P is closed (closed state). In the closed state, the opening/closing cover 11 closes an opening 12. FIGS. 2A and 2B illustrate a state in which the opening/closing cover 11 is open (open state). In the open state, the opening/closing cover 11 opens the opening 12, and hence when the process cartridge 5 is mounted to the apparatus main body 100, the process cartridge 5 can pass through the opening 12. In this manner, the opening/closing cover 11 is a member that is movable between an open position and a closed position. FIG. 2A is a schematic cross-sectional view of the printer P, and FIG. 2B is a perspective view of the printer P. Hereinafter, A in the drawings indicates a schematic cross-sectional view of the printer P, and B in the drawings indicate a perspective view of the printer P.

As illustrated in FIGS. 1A and 1B and FIGS. 2A and 2B, in the printer P, a sheet material stacking unit 9 (sheet stacking unit) for stacking therein sheet materials S discharged from a discharge roller pair 8 (discharge roller) is provided at a top surface part of the apparatus main body 100, and an opening/closing cover 11 is provided on the front side of the printer P.

The sheet material stacking unit 9 has, at a distal end side of the sheet material S in the discharge direction, a cutout 9*a* that forms a part of an opening 12 for access to the inside of the printer P. The opening/closing cover 11 has a front cover portion 11*a* that covers the front side of the printer P and a top surface slide portion 11*b* that covers the cutout 9*a*, and the top surface slide portion 11*b* is provided to be slidable with respect to the front cover portion 11*a*. The opening/closing cover 11 can rotate about a rotation axis of a rotation shaft 11*c* provided at a lower end part of the front cover portion 11*a*. In the closed state, the opening/closing cover 11 can move to the open position by rotating downward about the rotation axis (direction R in FIG. 2A), so that the opening/closing cover 11 can open and close the opening 12. The opening 12 is an opening provided in the housing 101 of the apparatus main body 100 as an access path used for the process cartridge 5 to pass therethrough for detaching and attaching. The opening 12 is formed over a region from a side surface part of the housing 101 to the top surface part thereof. When the opening/closing cover 11 is opened and closed as described later, the state of the opening 12 is switched between an open state in which the passing of the process cartridge 5 is allowed and a closed state in which the opening 12 is covered by the opening/closing cover 11.

In the state in which the opening/closing cover 11 is closed in FIGS. 1A and 1B, the top surface slide portion 11*b* is located at a closed position to close the cutout 9*a* while protruding from the front cover portion 11*a* due to a biasing force of the biasing unit 11*f*, so that the front side of the printer P and the cutout 9*a* are closed. The top surface slide portion 11*b* as a second cover portion in this case covers a region of the opening 12 corresponding to a top surface part of the housing 101. As illustrated in FIG. 2A, the attaching direction of the process cartridge 5 is indicated by D. Then, when the opening/closing cover 11 is located at the closed position as illustrated in FIG. 1A, the top surface slide portion 11*b* is opposed to a top surface 5*k* of the process cartridge 5 on the upstream side in the attaching direction D. Furthermore, the front cover portion 11*a* as a first cover portion covers a region of the opening 12 corresponding to a side surface part of the housing 101. In other words, when the opening/closing cover 11 is located at the closed position as illustrated in FIG. 1A, the front cover portion 11*a* is opposed to an end surface 5*m* of the process cartridge 5 on the upstream side in the attaching direction D.

Furthermore, in the state in which the opening/closing cover 11 is closed, the movement of the top surface slide portion 11*b* is regulated by locking unit (not shown) such that the top surface slide portion 11*b* cannot slide with respect to the opening/closing cover 11. The positional relation between the top surface slide portion 11*b* and the front cover portion 11*a* in FIG. 1A is sometimes referred to as "reference positional relation". The reference positional relation is a positional relation that is taken by the top surface slide portion 11*b* and the front cover portion 11*a* when the opening/closing cover 11 is located at the closed position (position to close the opening 12). Note that, in the present embodiment, the reference positional relation is not necessarily required to be taken when the opening/closing cover 11 is located at the closed position, but may be taken when the opening/closing cover 11 is located at the open position (position to open the opening 12) as illustrated in FIG. 2A.

Note that, in the present example, the top surface slide portion 11*b* also has a function of supporting the stacking of sheet materials S discharged from the discharge roller pair 8 as a part of the sheet material stacking unit 9, but whether to stack sheet materials S on the top surface slide portion 11*b* can be freely selected depending on the apparatus configuration of the printer P.

In the state in which the opening/closing cover 11 is open in FIGS. 2A and 2B, the opening/closing cover 11 rotates about the rotation shaft 11*c* as a fulcrum, and the opening 12 formed by the front side of the printer P and the cutout 9*a* is exposed. Thus, a user can insert and remove (detach and mount) the above-mentioned process cartridge 5 in and from the printer P through the opening 12. In the present example, as an image forming unit that can be detached and attached from and to the apparatus main body 100, not only an integrated process cartridge but also an exchangeable unit such as a toner cartridge, a drum cartridge, and a developing toner cartridge may be employed.

Figure 3A:
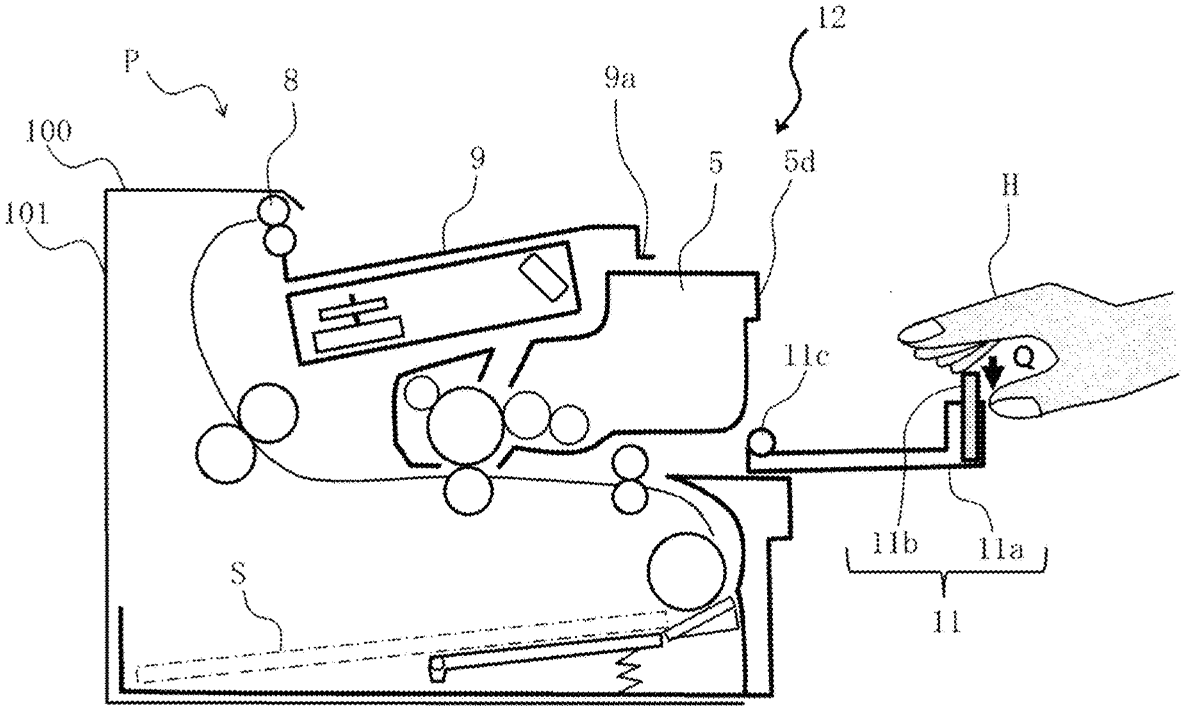
FIGS. 3A and 3B are a cross-sectional view and a perspective view of a state in which a top surface slide portion is slid in the first embodiment.

Furthermore, in the state in which the opening/closing cover 11 is open, the above-mentioned movement regulation of the top surface slide portion 11*b* is released, and the top surface slide portion 11*b* is slidable with respect to the front cover portion 11*a*. The top surface slide portion 11*b* is biased by the biasing unit 11*f* in a sliding protruding direction. The top surface slide portion 11*b* is held at a protruding position in a natural state, and only when a predetermined force or more is applied, the top surface slide portion 11*b* slides and retreats in a direction approaching the front cover portion 11*a*. The positional relation between the top surface slide portion 11*b* and the front cover portion 11*a* in FIG. 3A is also referred to as "retreating positional relation". The retreating positional relation is a positional relation that can be taken only when the opening/closing cover 11 is located at the open position, and is a positional relation in which the top surface slide portion 11*b* retreats from a locus through which the process cartridge 5 passes for detaching/attaching. In the opening/closing cover 11, the top surface slide portion 11*b* is biased by the biasing unit 11*f* in a direction (i) in which the top surface slide portion 11*b* is away from the front cover portion 11*a* so as to cover the top surface of the process cartridge 5 and (ii) intersecting with a surface of the front cover portion 11*a*.

1-(2) Detaching/attaching of Process Cartridge

Figure 3B:
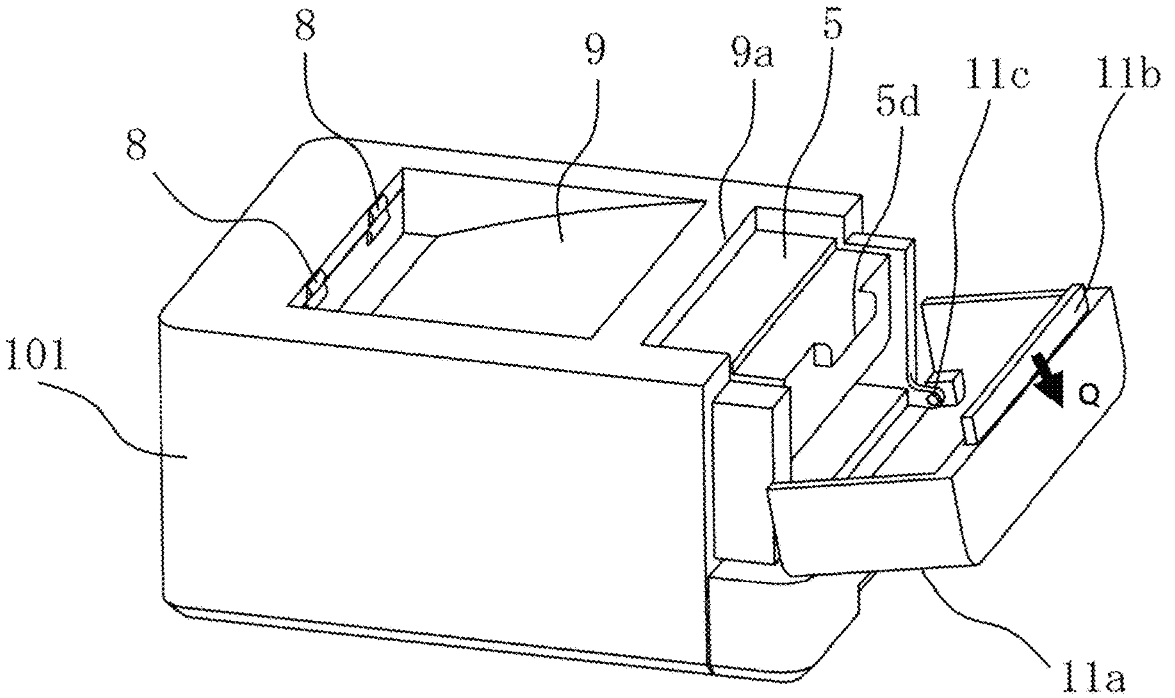
Figure 4A:
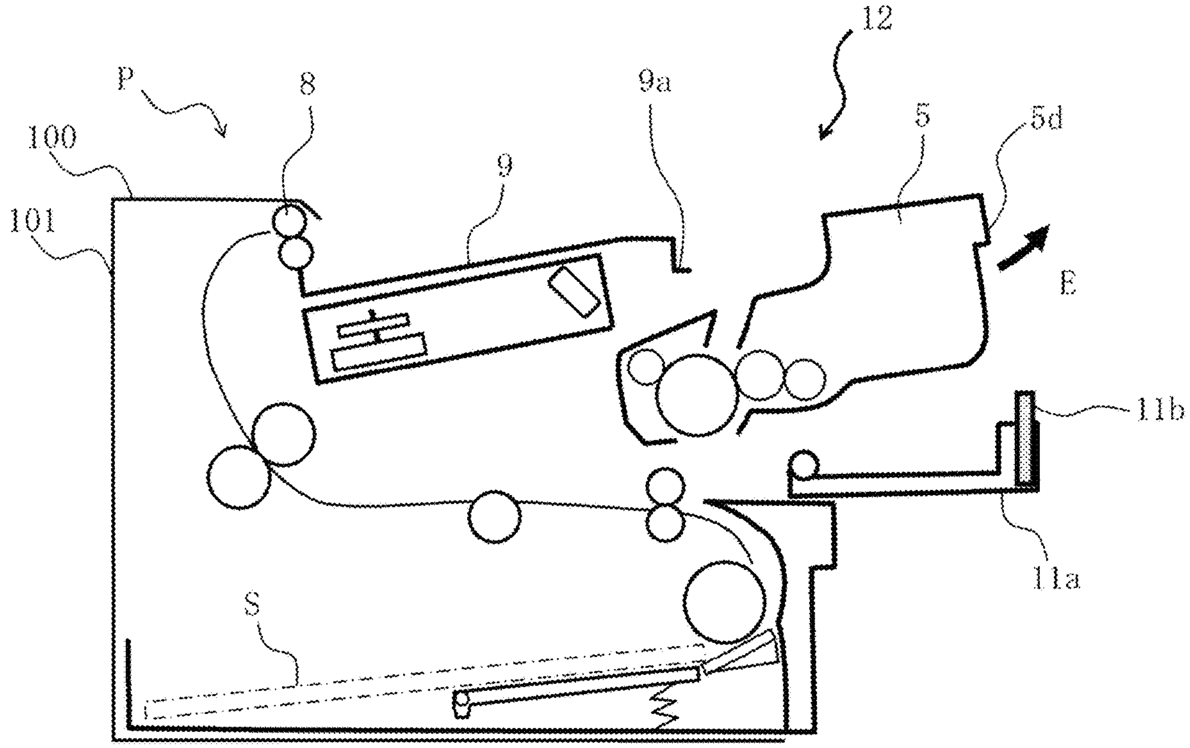
FIGS. 4A and 4B are a cross-sectional view and a perspective view of a state in which a cartridge is extracted in the first embodiment.
Figure 4B:
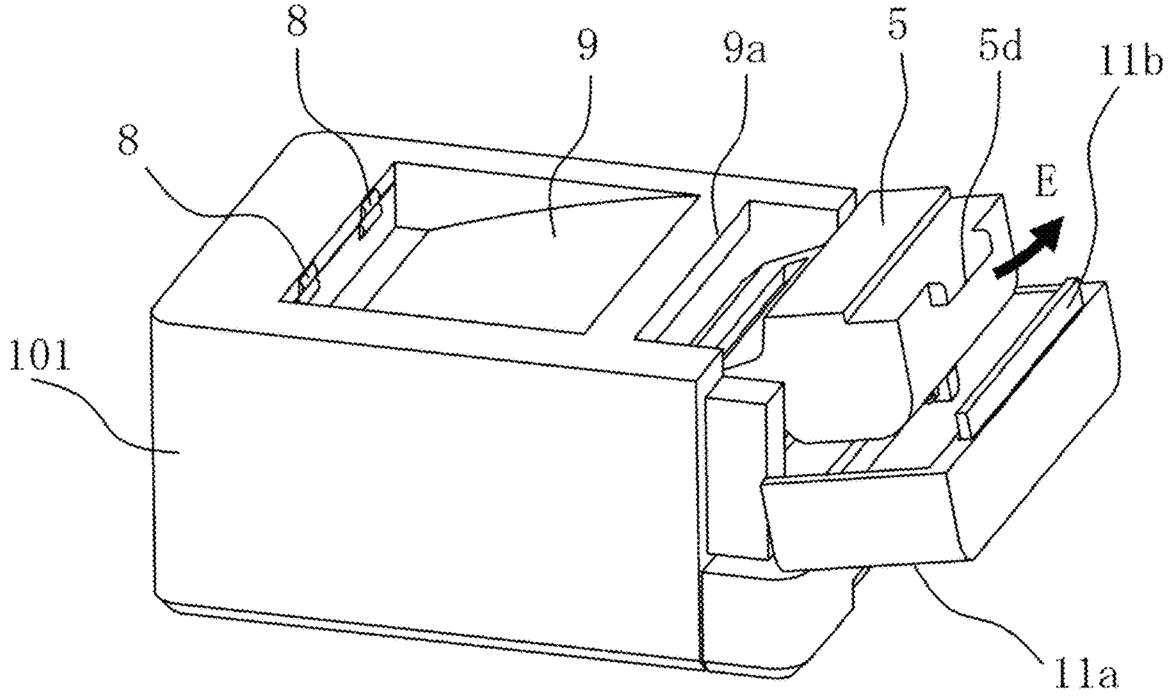

Detaching/attaching of the process cartridge 5 in the printer P is described with reference to FIGS. 3A and 3B and FIGS. 4A and 4B. FIGS. 3A and 3B illustrate a state in which the opening/closing cover 11 is open, and are explanatory diagrams of a state in which the top surface slide portion 11*b* is slidingly moved to a housing position at which the top surface slide portion 11*b* is housed on the front cover portion 11*a* side by an external force (direction Q) applied from a hand H of an operator of the printer P. FIGS. 4A and 4B are explanatory diagrams of a state in which the process cartridge 5 is taken out from the state in FIGS. 3A and 3B.

As illustrated in FIGS. 3A and 3B, a gripping portion 5*d* is provided at a center part of the process cartridge 5 in the width direction in the present embodiment. The process cartridge 5 mounted in the printer P is exposed to the opening 12, the gripping portion 5*d* can be visually recognized from above the cutout 9*a*.

Furthermore, the process cartridge 5 is configured to have a locus with which the process cartridge 5 can be pulled out of the printer P in the front upward direction, and is detached and attached as necessary by an operator of the apparatus.

In the state in which the opening/closing cover 11 is open in FIGS. 3A and 3B and FIGS. 4A and 4B, by the hand H of the operator, the top surface slide portion 11*b* moves from the protruding position to the housing position approaching the front cover portion 11*a*. Thus, the top surface slide portion 11*b* retreats from the vicinity of the inserting/removing locus of the process cartridge 5, and hence an operation space in front of the process cartridge 5 can be enlarged. In this manner, when the process cartridge 5 is pulled out of the printer P in the upper right direction in the drawing (direction E in FIG. 4A), a sufficient clearance can be secured between the hand H of the operator gripping the gripping portion 5*d* and the top surface slide portion 11*b*.

According to the present embodiment, when the opening/closing cover for opening and closing the opening for access to the process cartridge in the main body of the image forming apparatus is opened, the opening is greatly exposed, and at the same time, the visibility of the process cartridge in the opening is secured and the operability of detaching/attaching of the process cartridge is improved.

Note that, when the top surface slide portion 11*b* moves to the housing position, the top surface slide portion 11*b* may be engaged with the front cover portion 11*a* such that the sliding movement is inhibited, and when the opening/closing cover 11 is closed from the open state, the engagement with the front cover portion 11*a* may be released such that the top surface slide portion 11*b* can move to the sliding protruding direction.

Furthermore, in the state in which the opening/closing cover 11 is open, the force of gravity acting on the top surface slide portion 11*b* may exceed the biasing force of the biasing unit 11*f* such that the top surface slide portion 11*b* automatically slides and retreats. Alternatively, when a user moves the top surface slide portion 11*b* to the housing position in the state in which the opening/closing cover 11 is open, the top surface slide portion 11*b* may be fixed to the housing position against the biasing force of the biasing unit 11*f* due to activation of a lock mechanism (not shown). In this case, the user may release the lock mechanism so as to slide the top surface slide portion 11*b* when closing the opening/closing cover 11.

Second Embodiment

Figure 5A:
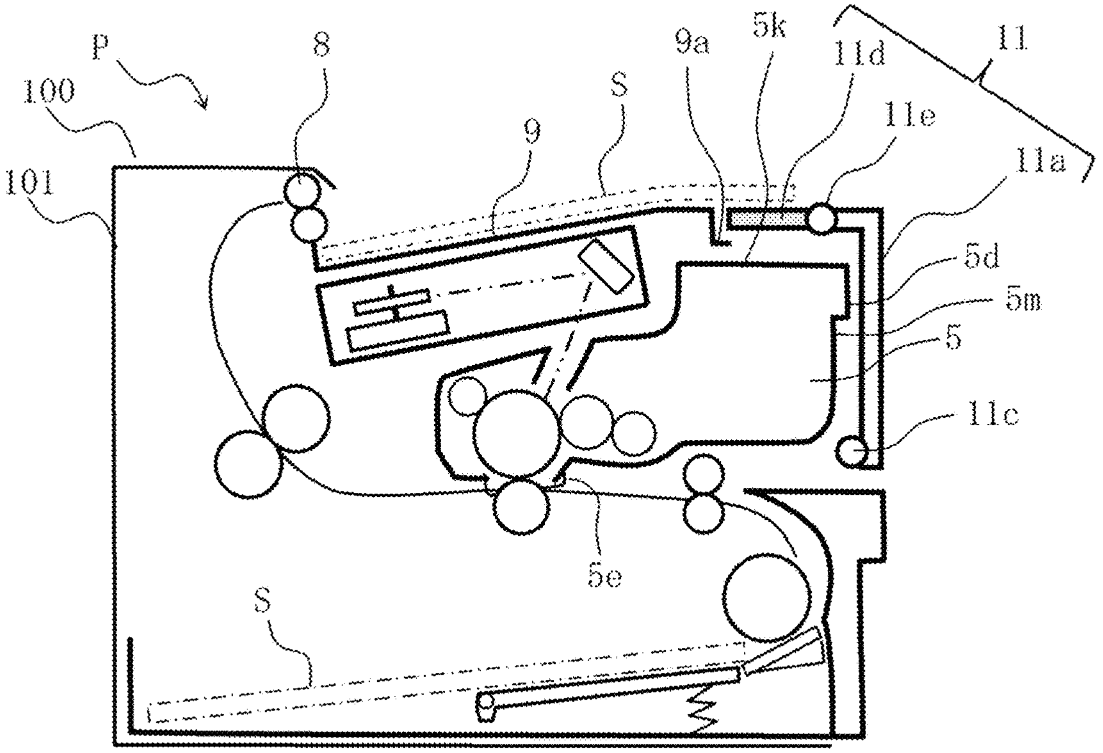
FIGS. 5A and 5B are a cross-sectional view and a perspective view of a printer in a state in which an opening/closing cover is closed in a second embodiment.
Figure 5B:
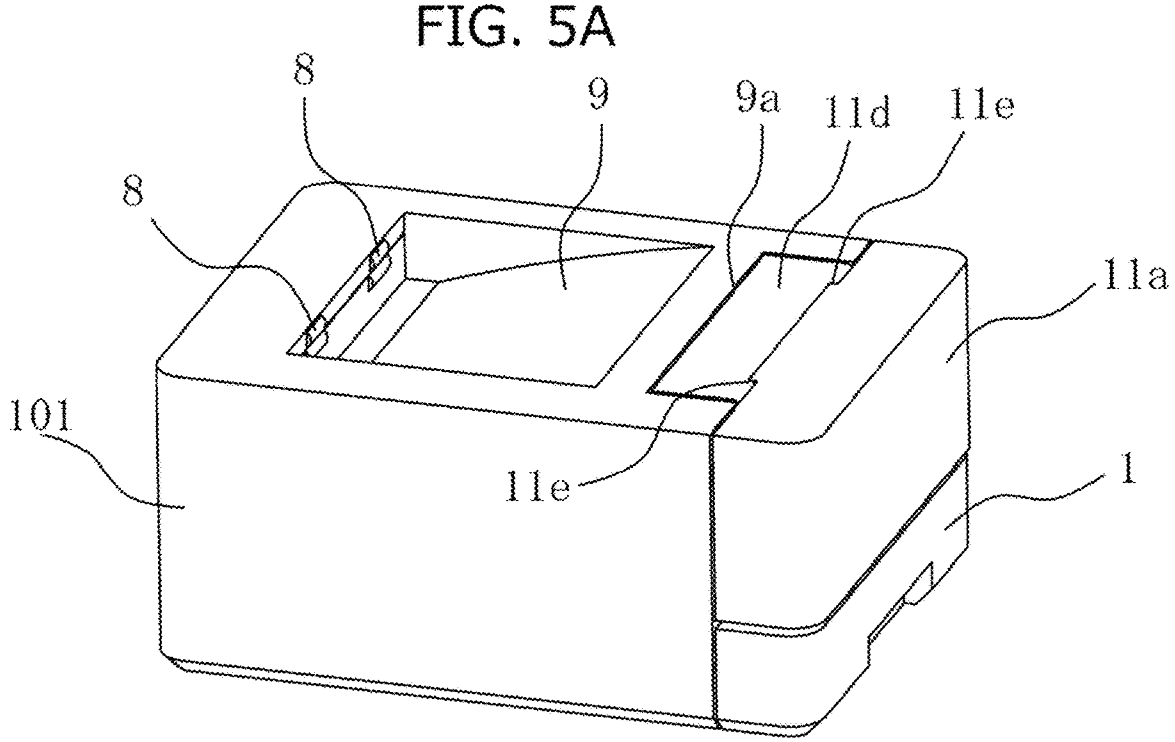
Figure 6A:
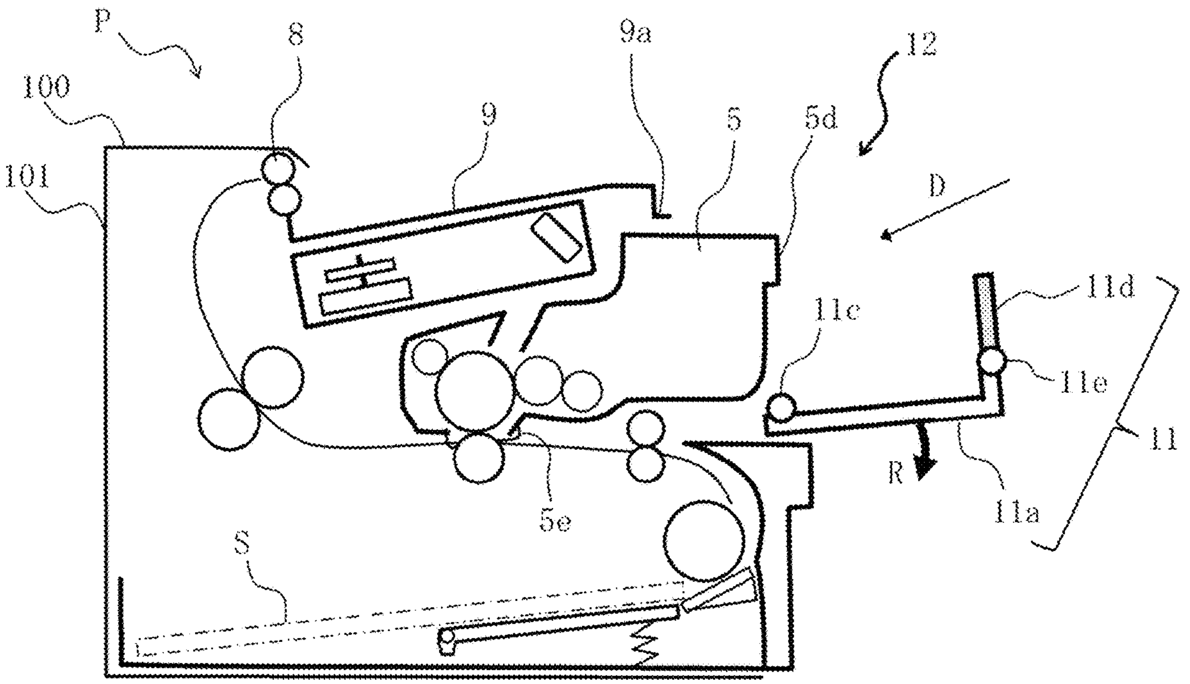
FIGS. 6A and 6B are a cross-sectional view and a perspective view of the printer in a state in which the opening/closing cover is open in the second embodiment.
Figure 6B:
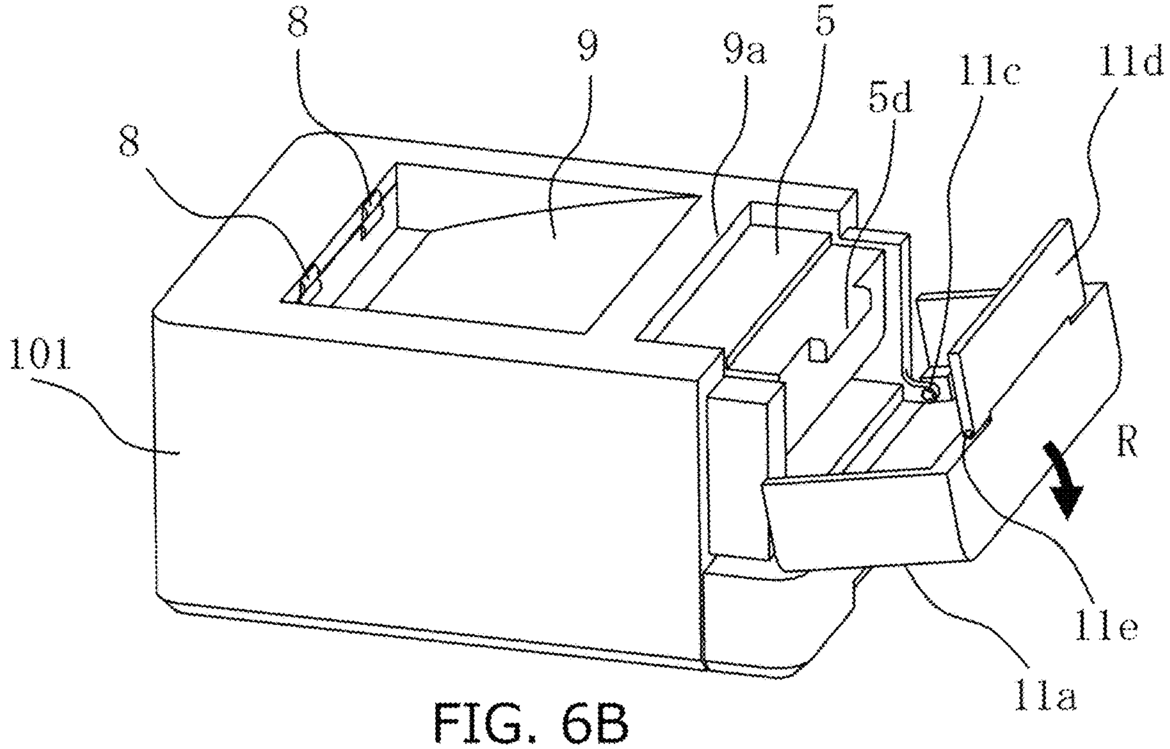
Figure 7A:
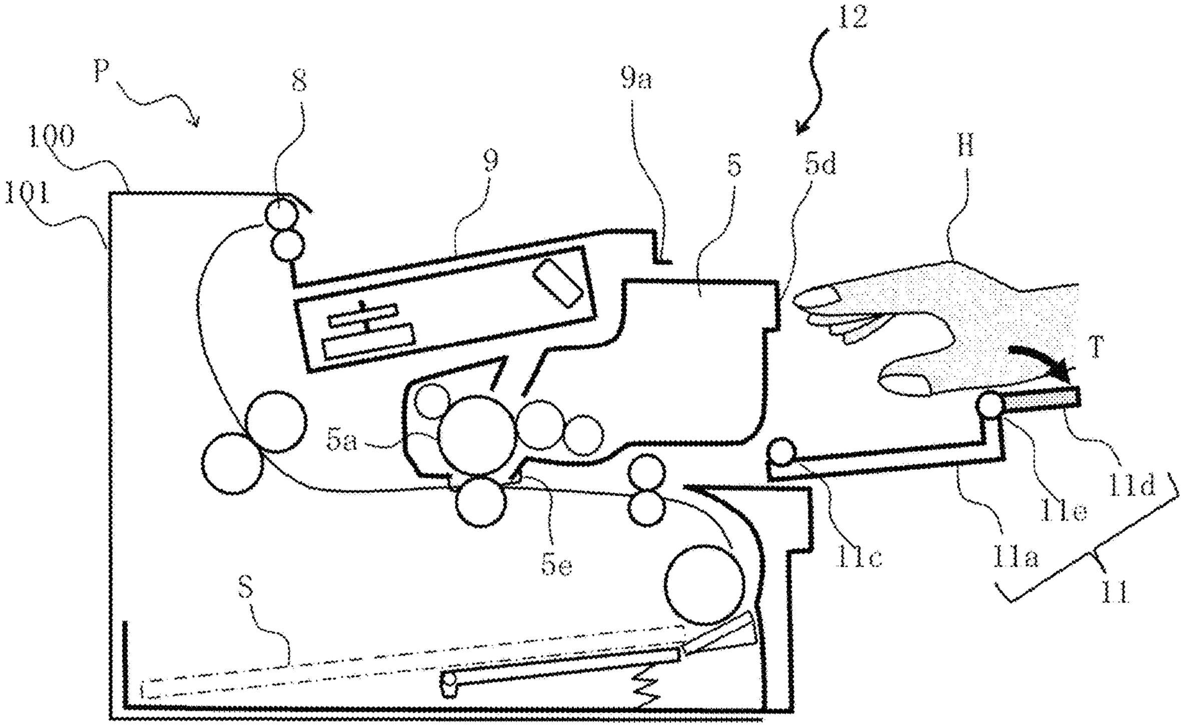
FIGS. 7A and 7B are a cross-sectional view and a perspective view of a state in which a top surface rotating portion is rotated to a rotating position in the second embodiment.
Figure 7B:
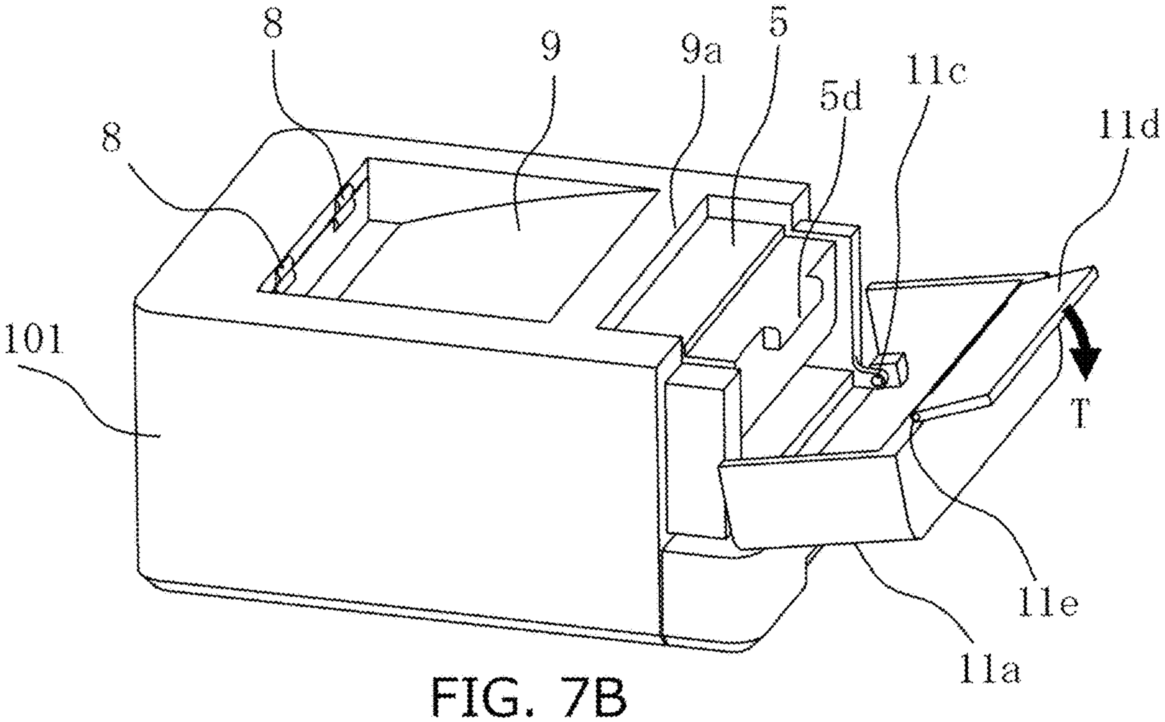
Figure 8A:
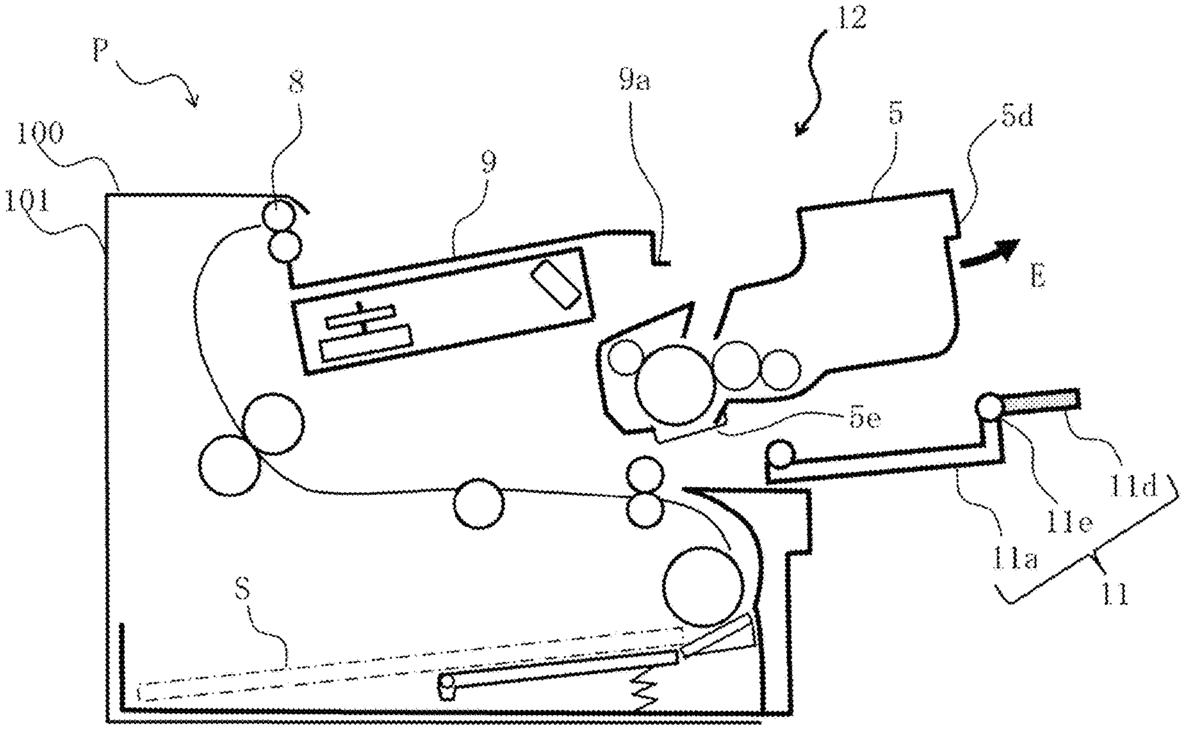
FIGS. 8A and 8B are a cross-sectional view and a perspective view of a state in which a cartridge is taken out in the second embodiment.
Figure 8B:
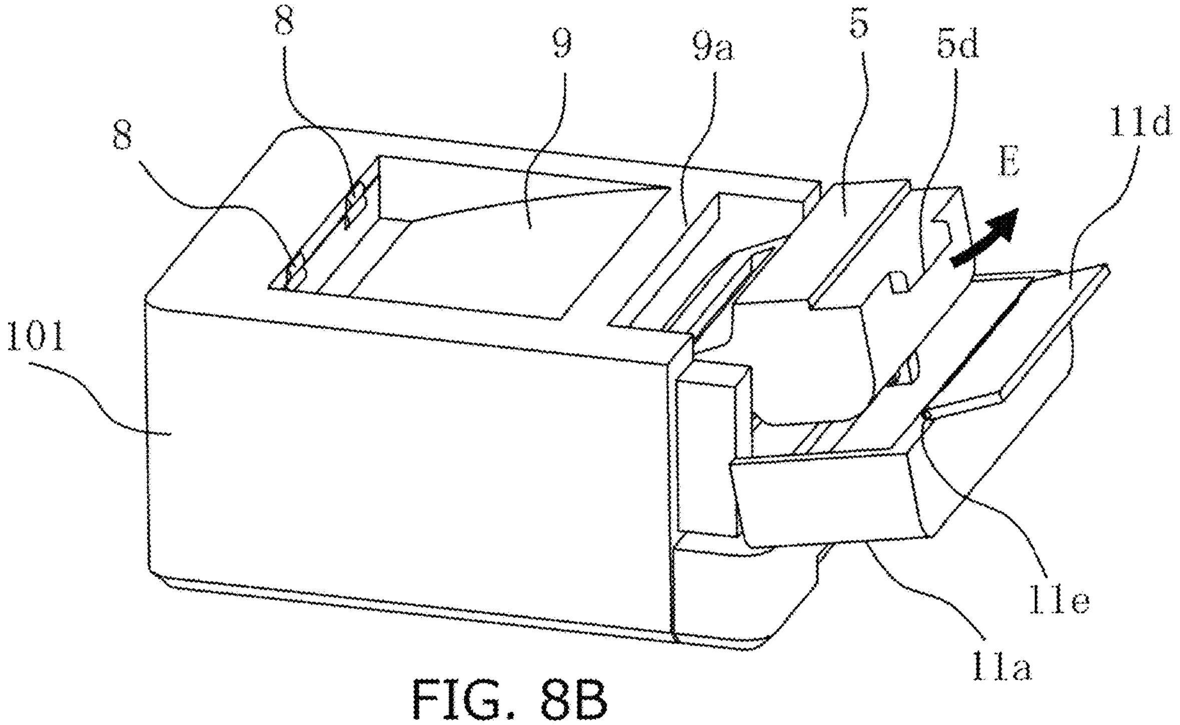
Figure 9A:
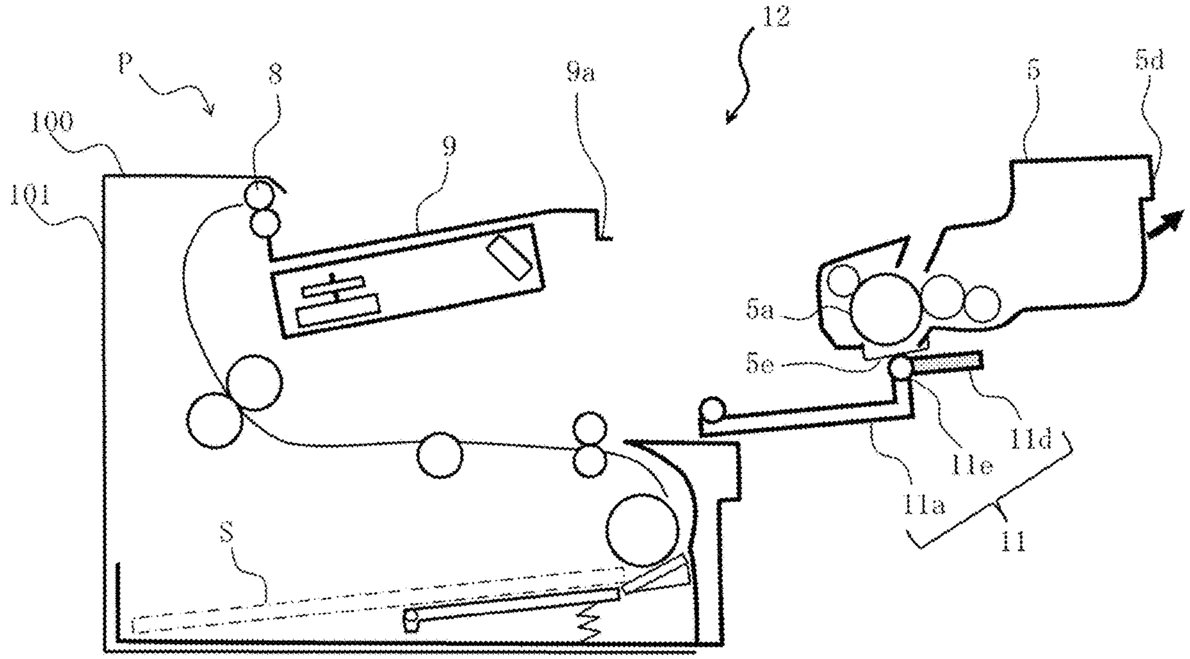
FIGS. 9A and 9B are a cross-sectional view and a perspective view of a state in which the cartridge contacts the top surface rotating portion in the second embodiment.
Figure 9B:
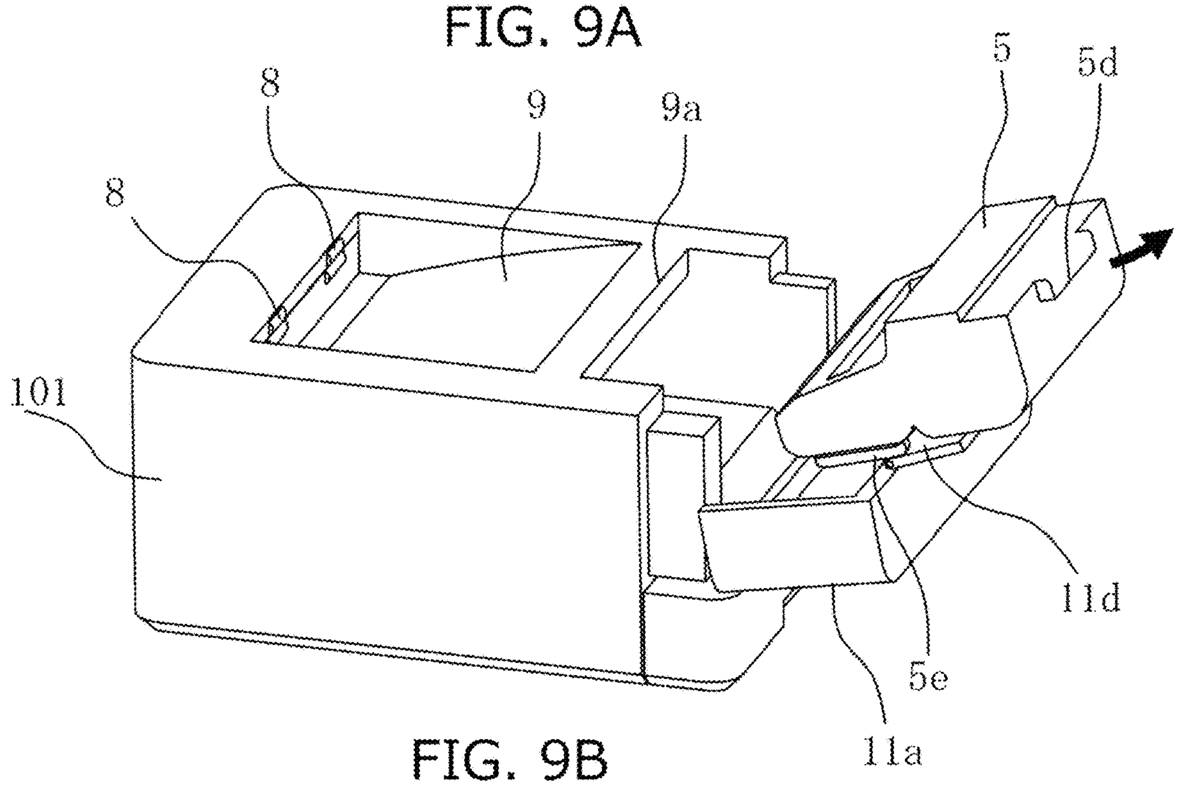

Next, a configuration of an opening/closing cover 11 in an image forming apparatus in a second embodiment of the present invention is described with reference to FIG. 5A to FIG. 8B. FIGS. 5A and 5B illustrate a state in which the opening/closing cover 11 in the printer P is closed. In the closed state, the opening/closing cover 11 closes the opening 12. FIGS. 6A and 6B illustrate a state in which the opening/closing cover 11 in the printer P is open. In the open state, the opening/closing cover 11 opens the opening 12, and hence when the process cartridge 5 is mounted to the apparatus main body 100, the process cartridge 5 can pass through the opening 12. In this manner, the opening/closing cover 11 is a member that is movable between an open position and a closed position. FIGS. 7A and 7B illustrate a state in which the opening/closing cover 11 is open, and are explanatory diagrams of a state in which the top surface rotating portion 11*d* is rotated to a rotating position from the state in FIGS. 6A and 6B. FIGS. 8A and 8B are explanatory diagrams of a state in which the process cartridge 5 is taken out from the state in FIGS. 7A and 7B. FIGS. 9A and 9B are explanatory diagrams of a state in which the process cartridge 5 in the taken-out state contacts the top surface rotating portion 11*d*. Note that the same configurations as in the above-mentioned first embodiment are denoted by the same reference symbols, and descriptions thereof are omitted. A in the drawings indicates a schematic cross-sectional view of the printer P, and B in the drawings indicates a perspective view of the printer P.

2-(1) Open/Close Cover

As illustrated in FIGS. 5A and 5B, similarly to the first embodiment, the opening/closing cover 11 is provided on the front side of the printer P. The opening/closing cover 11 includes a front cover portion 11*a* as a first cover portion that covers the front side of the printer P and a top surface rotating portion 11*d* as a second cover portion that covers a cutout 9*a*. The opening/closing cover 11 can rotate about a first rotation axis of the rotation shaft 11*c* provided at a lower end part of the front cover portion 11*a*. In the closed state, the opening/closing cover 11 rotate downward about the first rotation axis, and thus can move to an open position (first rotation direction R in FIG. 6A). Furthermore, the top surface rotating portion 11*d* in FIGS. 7A and 7B has a second rotation shaft 11*e*, and a second rotation axis as an axis of the second rotation shaft 11*e* extends in the same direction as the first rotation axis as an axis of the rotation shaft 11*c*. Thus, the top surface rotating portion 11*d* can rotate about the second rotation axis of the second rotation shaft 11*e* in the same direction as the first rotation direction with respect to the front cover portion 11*a*.

In the state in which the opening/closing cover 11 is closed in FIGS. 5A and 5B, the top surface rotating portion 11*d* is located at a closed position to close the opening 12 at a substantially right angle with respect to the front cover portion 11*a* due to a biasing member (not shown), and is configured to close the cutout 9*a* and the front side of the printer P. The top surface rotating portion 11*d* as the second cover portion in this case covers a region of the opening 12 corresponding to a top surface part of the housing 101. As illustrated in FIG. 6A, the attaching direction of the process cartridge 5 is indicated by D. Then, when the opening/closing cover 11 is located at the closed position in FIG. 5A, the top surface rotating portion 11*d* is opposed to the top surface 5*k* of the process cartridge 5 on the upstream side in the attaching direction D. Furthermore, the front cover portion 11*a* as the first cover portion covers a region of the opening 12 corresponding to a side surface part of the housing 101. In other words, when the opening/closing cover 11 is located at the closed position in FIG. 5A, the front cover portion 11*a* is opposed to the end surface 5*m* of the process cartridge 5 on the upstream side in the attaching direction D.

Furthermore, in the state in which the opening/closing cover 11 is closed, the top surface rotating portion 11*d* is regulated so as not to rotate with respect to the opening/closing cover 11 due to an engaging relation with another cover (not shown) of the printer P. When the top surface rotating portion 11*d* has the positional relation in FIG. 5A with respect to the front cover portion 11*a*, the top surface rotating portion 11*d* has a first posture with respect to the front cover portion 11*a*. When the opening/closing cover 11 is in the closed state in FIG. 5A, the top surface rotating portion 11*d* has the first posture, and is opposed to the top surface 5*k* of the process cartridge 5. However, as illustrated in FIG. 6A, even when the opening/closing cover 11 is located at the open position (position to open the opening 12), the top surface rotating portion 11*d* can take the first posture.

In the state in which the opening/closing cover 11 is open in FIGS. 6A and 6B, the opening/closing cover 11 rotates about the rotation shaft 11*c* as a fulcrum such that the opening 12 is exposed. Furthermore, in this state, the rotation of the top surface rotating portion 11*d* is not regulated because the engaging relation with another cover (not shown) is eliminated, and hence can freely rotate with respect to the front cover portion 11*a* in both a clockwise direction and a counterclockwise direction in FIGS. 6A and 6B. Furthermore, the top surface rotating portion 11*d* is configured to automatically restore to a position at a substantially right angle with the front cover portion 11*a* by a biasing member (not shown).

2-(2) Detaching/Attaching of Process Cartridge

Detaching/attaching of the process cartridge 5 in the printer P is described with reference to FIGS. 7A and 7B, FIGS. 8A and 8B, and FIGS. 9A and 9B.

As illustrated in FIGS. 7A and 7B, in the state in which the opening/closing cover 11 is open, the process cartridge 5 mounted in the printer P is exposed to the opening 12, and a user can visually recognize the gripping portion 5*d* from above the printer P. Furthermore, on both sides of the process cartridge 5 in the width direction in the vicinity of the lower space of the photosensitive drum 5*a*, rib portions 5*e* protruding from the photosensitive drum 5*a* are provided.

FIGS. 7A and 7B and FIGS. 8A and 8B illustrate a state in which after the opening/closing cover 11 is open, the top surface rotating portion 11*d* is pushed down by the hand H of the operator (direction T). The top surface rotating portion 11*d* can freely rotate and track an operation region through which the hand H of the operator can pass for the detaching/attaching of the process cartridge 5. Thus, as illustrated in FIGS. 8A and 8B, the top surface rotating portion 11*d* does not hinder the detaching/attaching work by the operator. In FIG. 7A and FIG. 8A, the posture of the top surface rotating portion 11*d* that has rotated about the second rotation axis with respect to the front cover portion 11*a* is referred to as "second posture". The second posture is a positional relation in which the top surface rotating portion 11*d* retreats from a locus through which the process cartridge 5 passes for detaching/attaching. The top surface rotating portion 11*d* is configured to be transitioned to the second posture from the first posture by being rotated, with respect to the front cover portion 11*a*, in the first rotation direction R about a second rotation axis extending in a direction of the first rotation axis.

Furthermore, as illustrated in FIGS. 9A and 9B, in the process of detaching and attaching the process cartridge 5, the rib portions 5*e* provided at the bottom surface of the process cartridge 5 contact the top surface rotating portion 11*d* and push down the top surface rotating portion 11*d*. In this manner, the top surface rotating portion 11*d* retreats from a pull-out locus of the process cartridge 5, and the photosensitive drum 5*a* and the top surface rotating portion 11*d* do not interfere with each other. And, in the closed position of FIGS. 5A and 5B, the top surface rotating portion 11*d* is engaged with the housing so that the position of the top surface rotating portion 11*d* is restricted so as not to be transitioned from the first posture to the second posture. And, in the open position of FIGS. 6A and 6B, the top surface rotating portion 11*d* is configured to be transitioned from the first posture to the second posture with respect to the front cover portion 11*a* by an external force being applied to the top surface rotating portion 11*d*.

As described above, throughout all steps of the detaching and attaching work of the process cartridge 5, the top surface rotating portion 11*d* can be rotated to a position to retreat from the detaching/attaching operation area.

In the present example, the rib portion 5*e* is provided to the process cartridge 5, but the configuration is not limited thereto. A shape having the same function as the rib portion 5*e* may be provided to the housing or the opening/closing cover 11 of the printer P.

Third Embodiment

Figure 10A:
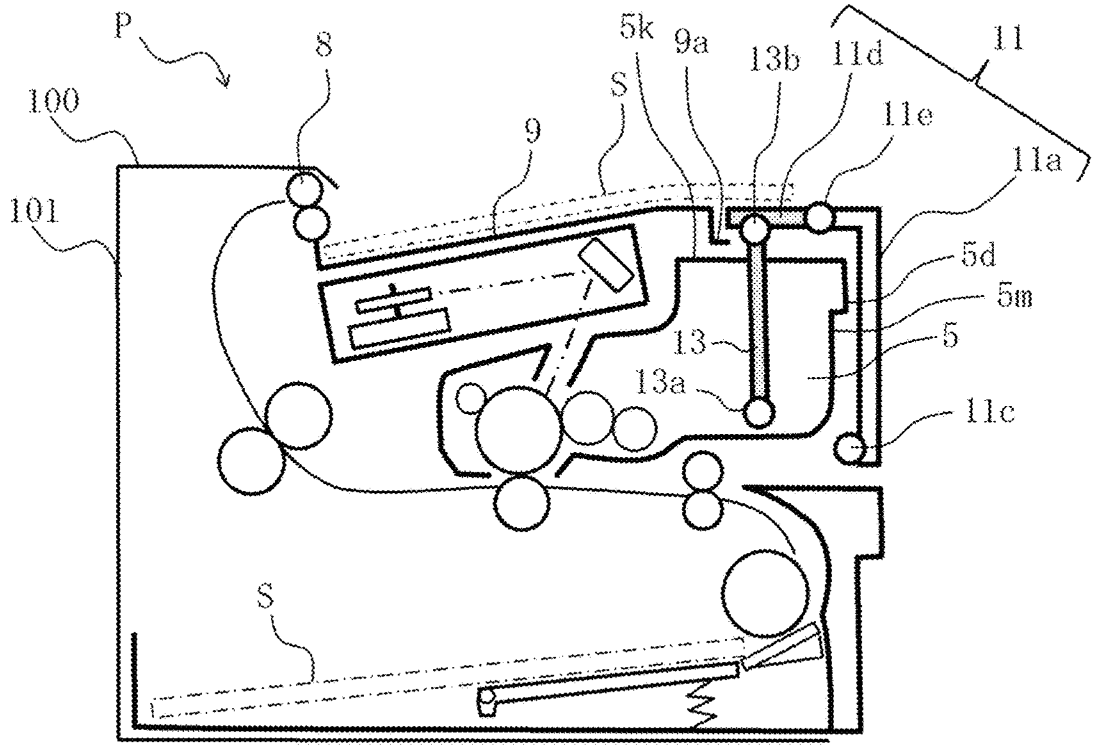
FIGS. 10A and 10B are a cross-sectional view and a perspective view of a printer in a state in which an opening/closing cover is closed in a third embodiment.
Figure 10B:
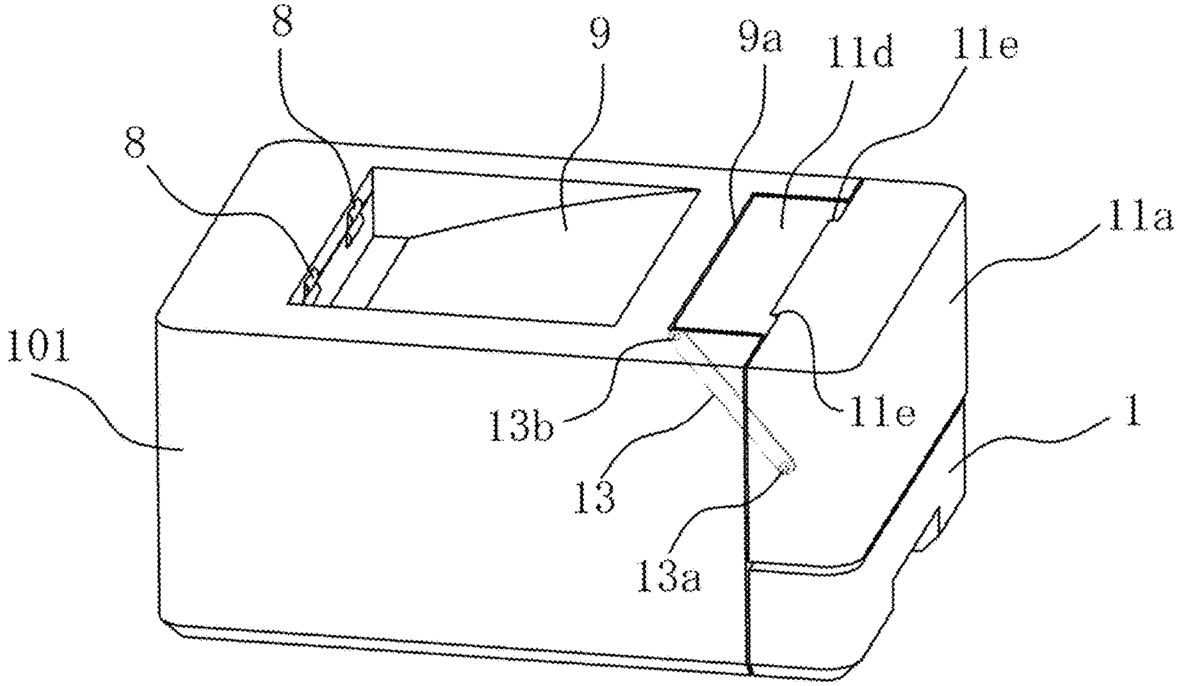
Figure 11A:
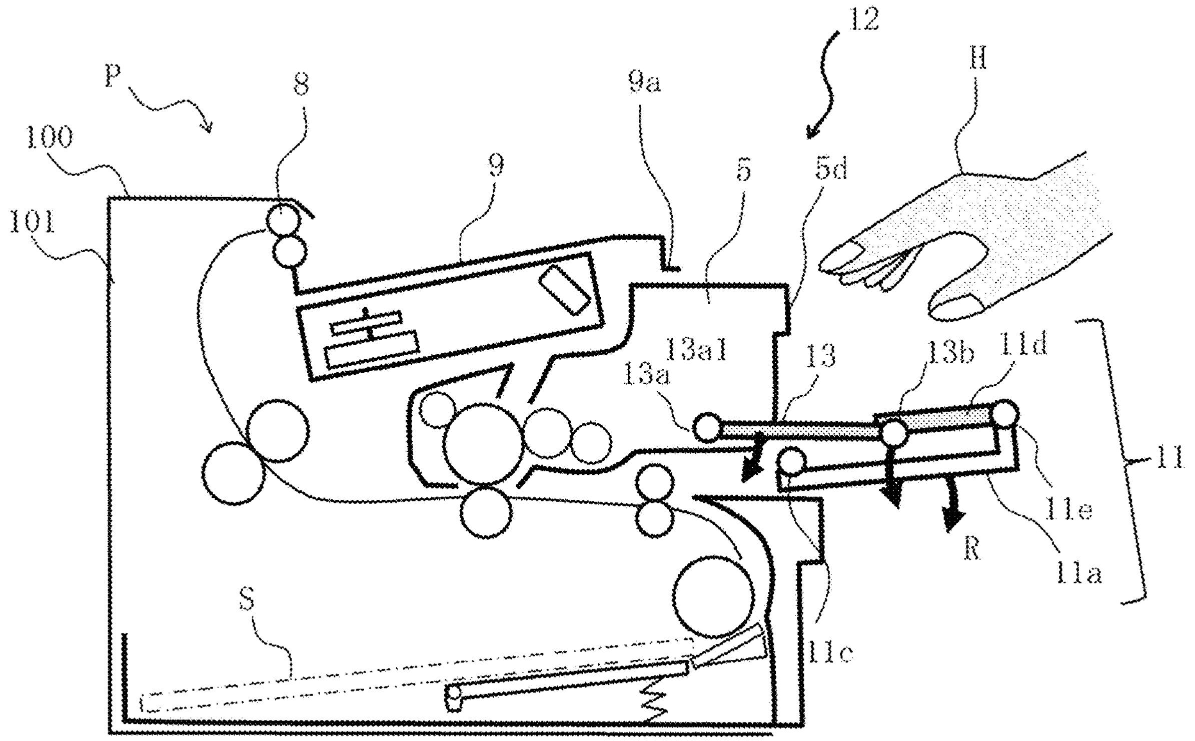
FIGS. 11A and 11B are a cross-sectional view and a perspective view of the printer in a state in which the opening/closing cover is open in the third embodiment.
Figure 11B:
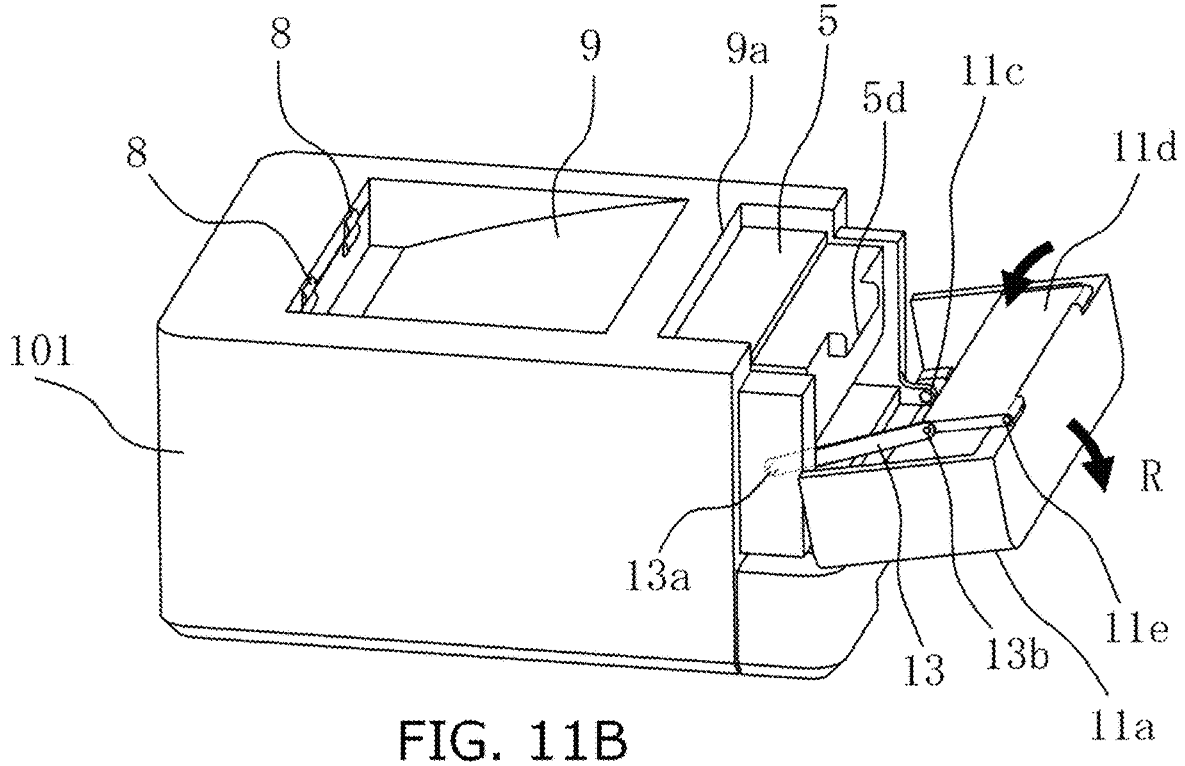
Figure 12A:
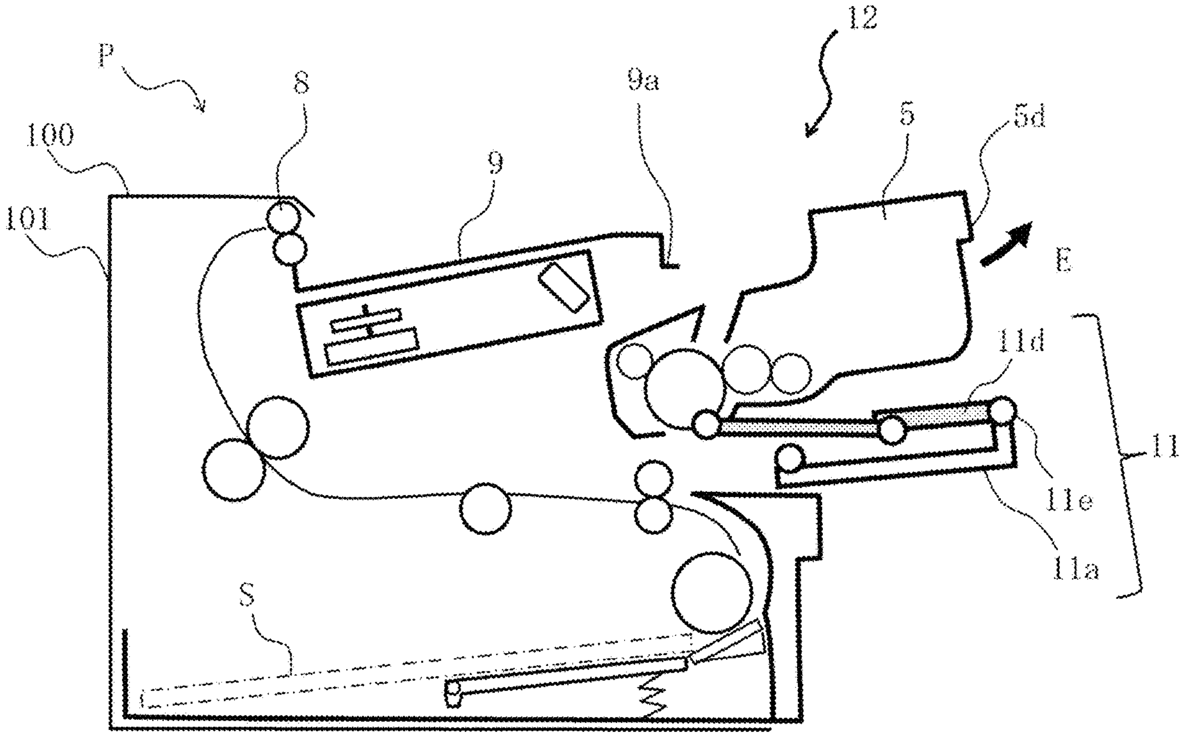
FIGS. 12A and 12B are a cross-sectional view and a perspective view of a state in which the cartridge is extracted in the third embodiment.
Figure 12B:
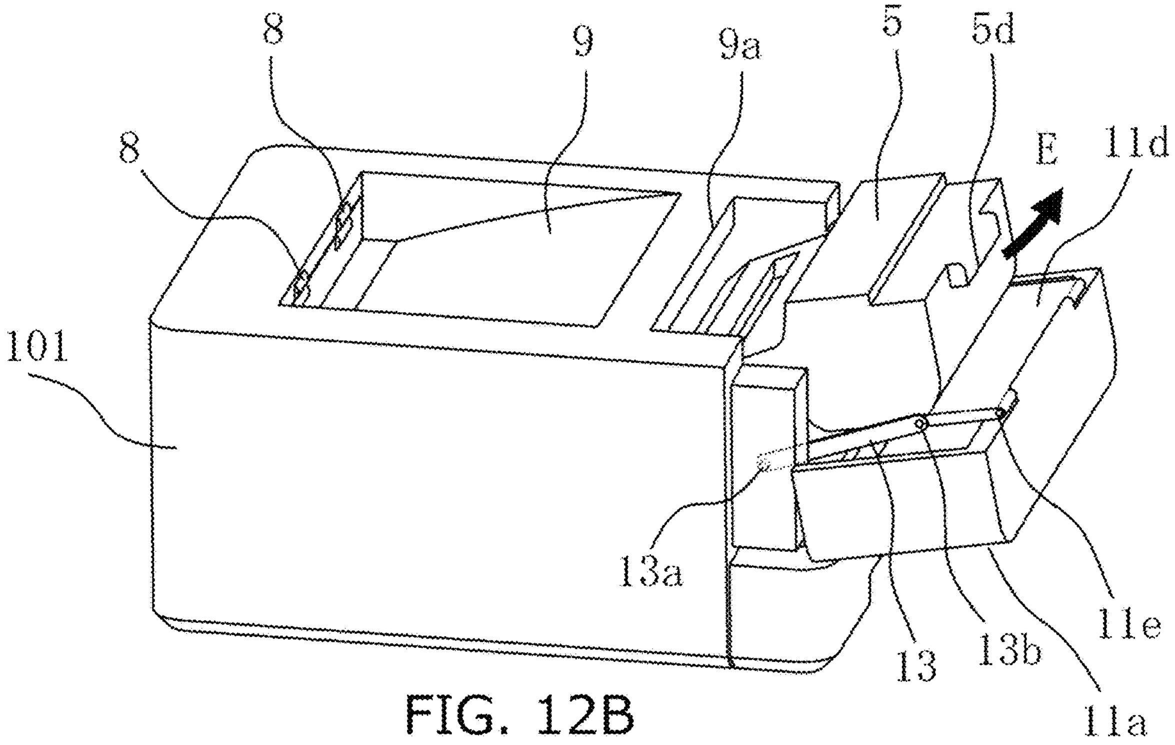

Next, a configuration of an opening/closing cover 11 in an image forming apparatus in a third embodiment of the present invention is described with reference to FIG. 10A to FIG. 12B. FIGS. 10A and 10B illustrate a state in which the opening/closing cover 11 in the printer P is closed. In the closed state, the opening/closing cover 11 closes the opening 12. FIGS. 11A and 11B illustrate a state in which the opening/closing cover 11 in the printer P is open. In the open state, the opening/closing cover 11 opens the opening 12, and hence when the process cartridge 5 is mounted to the apparatus main body 100, the process cartridge 5 can pass through the opening 12. In this manner, the opening/closing cover 11 is a member that is movable between an open position and a closed position. The opening/closing cover 11 can rotate about a first rotation axis of a rotation shaft 11*c* provided at a lower end part of the front cover portion 11*a*. FIGS. 12A and 12B illustrate a state in which the opening/closing cover 11 is open, and are explanatory diagrams of a state in which the process cartridge 5 is extracted from the state in FIGS. 11A and 11B. Note that the same configurations as in the above-mentioned first embodiment and second example are denoted by the same reference symbols, and descriptions thereof are omitted. A in the drawings indicates a schematic cross-sectional view of the printer P, and B in the drawings indicates a perspective view of the printer P.

3-(1) Open/Close Cover

As illustrated in FIGS. 10A and 10B, the printer P is provided with an opening/closing cover 11 formed of a front cover portion 11*a* and a top surface rotating portion 11*d*. Furthermore, the printer P includes an opening/closing link portion 13 having a first link shaft 13*a* and a second link shaft 13*b*. The housing 101 of the printer P is linked with the first link shaft 13*a*, and the top surface rotating portion 11*d* is linked with the second link shaft 13*b*, so that the rotation state of the top surface rotating portion 11*d* can be switched through the opening/closing link portion 13.

In the state in which the opening/closing cover 11 is closed in FIGS. 10A and 10B, the opening/closing link portion 13 regulates the top surface rotating portion 11*d* to a closed position to close the cutout 9*a* at a substantially right angle with respect to the front cover portion 11*a*. In this case, the top surface rotating portion 11*d* as a second cover portion covers a region of the opening 12 corresponding to a top surface part of the housing 101. In other words, the top surface rotating portion 11*d* is opposed to the top surface 5*k* of the process cartridge 5 on the upstream side in the attaching direction D. Furthermore, the front cover portion 11*a* as a first cover portion covers a region of the opening 12 corresponding to a side surface part of the housing 101. In other words, the front cover portion 11*a* is opposed to the end surface 5*m* of the process cartridge 5 on the upstream side in the attaching direction D. When the top surface rotating portion 11*d* has the positional relation in FIG. 10A with respect to the front cover portion 11*a*, the top surface rotating portion 11*d* has a first posture with respect to the front cover portion 11*a*. In other words, when the opening/closing cover 11 is in the closed state, the top surface rotating portion 11*d* has the first posture.

In the state in which the opening/closing cover 11 is open in FIGS. 11A and 11B, the opening/closing link portion 13 regulates the top surface rotating portion 11*d* such that the top surface rotating portion 11*d* moves to a position that is folded at an acute angle toward the front cover portion 11*a*. The posture of the top surface rotating portion 11*d* with respect to the front cover portion 11*a* in FIG. 11A is referred to as "second posture". The second posture is a positional relation in which the top surface rotating portion 11*d* retreats from a locus through which the process cartridge 5 passes for detaching/attaching.

3-(2) Detaching/Attaching of Process Cartridge

Detaching/attaching of the process cartridge 5 in the printer P is described with reference to FIGS. 11A and 11B and FIGS. 12A and 12B. As illustrated in FIGS. 11A and 11B, in the state in which the opening/closing cover 11 is open, the process cartridge 5 attached in the printer P is exposed to the opening 12, and the gripping portion 5*d* can be visually recognized from above the printer P.

The top surface rotating portion 11*d* illustrated in FIGS. 11A and 11B is located at an open position due to the opening/closing link portion 13. In this state, the top surface rotating portion 11*d* retreats from the vicinity of a pullout locus of the process cartridge 5, and hence an operation space on the front side of the process cartridge 5 can be enlarged.

Next, FIGS. 12A and 12B illustrate a state in which an operator grips the gripping portion 5*d* of the process cartridge 5 and pulls the process cartridge 5 out of the printer P in the upper right direction in the drawings. In this state, the top surface rotating portion 11*d* retreats from the front side of the process cartridge 5, and hence the hand H of the operator gripping the gripping portion 5*d* is less likely to interfere with the top surface rotating portion 11*d*.

As described above, the top surface rotating portion 11*d* can be rotated to a position that retreats from a detaching/mounting operation area in conjunction with the opening operation of the opening/closing cover 11. At this time, the top surface rotation portion 11*d* is transitioned from the first posture to the second posture with respect to the front cover portion 11*a*.

Note that, in the present example, the top surface rotating portion 11*d* is rotated in conjunction with the opening operation of the opening/closing cover 11 by the opening/closing link portion 13, but the top surface rotating portion 11*d* may be configured to slide in conjunction with the opening/closing operation of the opening/closing cover 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166495, filed on Sep. 27, 2023, which is hereby incorporated by reference wherein in its entirety.

What is claimed is:

1. An image forming apparatus, comprising:

a cartridge; and an apparatus main body to which the cartridge is attached in an attaching direction, the apparatus main body including:

a housing provided with an opening through which the cartridge passes when the cartridge is attached to the apparatus main body; and an opening/closing member configured to move, with respect to the housing, between a closed position in which the opening/closing member closes the opening and an open position in which the opening/closing member opens the opening, wherein the opening/closing member includes a first cover portion which is opposed to an end surface of the cartridge on an upstream side in the attaching direction so as to cover the end surface of the cartridge when the opening/closing member is located at the closed position and a second cover portion which is opposed to a top surface of the cartridge on the upstream side so as to cover the top surface of the cartridge when the opening/closing member is located at the closed position, wherein the opening/closing member is rotatable from the closed position to the open position by being rotated downward about a rotation axis that extends in a direction intersecting a gravity direction and that is provided at a lower end part of the first cover portion when the opening/closing member is located at the closed position, wherein the second cover portion is configured to slide with respect to the first cover portion between:

(a) a protruding position in which the second cover portion protrudes relative to the first cover portion so as to cover the top surface of the cartridge when the opening/closing member is located at the closed position, and (b) a retracted position in which the second cover portion is retracted from a locus through which the cartridge passes when the cartridge is detached from and attached to the apparatus main body, and wherein, when the opening/closing member is located at the closed position with the first cover portion opposed to the end surface of the cartridge, the first cover portion prevents detachment of the cartridge from the apparatus main body.

2. The image forming apparatus according to claim 1, wherein the second cover portion is biased by a biasing unit in a direction (i) in which the second cover portion is moved from the retracted position to the protruding position and (ii) intersecting a surface of the first cover portion, and when the opening/closing member is located at the closed position, the second cover portion is disposed at the protruding position by a biasing force of the biasing unit.

3. The image forming apparatus according to claim 2, wherein when the opening/closing member is located at the open position, the second cover portion is configured to slide in a direction in which the second cover portion is moved from the protruding position to the retracted position against the biasing force due to gravity.

4. The image forming apparatus according to claim 1, further comprising:

a sheet stacking unit exposed to outside of the image forming apparatus; and a discharge roller configured to discharge a sheet on which an image is formed to the sheet stacking unit in a discharge direction, wherein when the opening/closing member is located at the closed position, a top surface of the second cover portion is a part of the sheet stacking unit.

5. The image forming apparatus according to claim 1, further comprising:

a sheet stacking unit exposed to outside of the image forming apparatus; and a discharge roller configured to discharge a sheet on which an image is formed to the sheet stacking unit in a discharge direction, wherein when the opening/closing member is located at the closed position, the first cover portion constitutes a part of an end surface of the image forming apparatus on a downstream side in the discharge direction.

6. The image forming apparatus according to claim 5, further comprising:

a second sheet stacking unit on which a sheet is stacked; and a feed roller configured to feed the sheet from the second sheet stacking unit in a feeding direction, wherein the feeding direction is opposite to the discharge direction.

7. An image forming apparatus, comprising:

a cartridge; and an apparatus main body to which the cartridge is attached in an attaching direction, the apparatus main body including:

a housing provided with an opening through which the cartridge passes when the cartridge is attached to the apparatus main body; and an opening/closing member configured to move, with respect to the housing, between a closed position in which the opening/closing member closes the opening and an open position in which the opening/closing member opens the opening, wherein the opening/closing member includes a first cover portion which is opposed to an end surface of the cartridge on an upstream side in the attaching direction so as to cover the end surface of the cartridge when the opening/closing member is located at the closed position and a second cover portion which is opposed to a top surface of the cartridge on the upstream side so as to cover the top surface of the cartridge when the opening/closing member is located at the closed position, wherein the opening/closing member is rotatable from the closed position to the open position by being rotated in a first rotation direction downward about a first rotation axis that extends in a direction intersecting a gravity direction and that is provided at a lower end part of the first cover portion when the opening/closing member is located at the closed position, and wherein the second cover portion has a first posture and a second posture with respect to the first cover portion, the second cover portion in the first posture being opposed to the top surface of the cartridge when the opening/closing member is located at the closed position, the second cover portion being configured to be transitioned to the second posture from the first posture by being rotated, with respect to the first cover portion, in the first rotation direction about a second rotation axis extending in a direction of the first rotation axis, and wherein, when the opening/closing member is located at the closed position with the first cover portion opposed to the end surface of the cartridge, the first cover portion prevents detachment of the cartridge from the apparatus main body.

8. The image forming apparatus according to claim 7, wherein when the opening/closing member is located at the closed position, the second cover portion is engaged with the housing so that a position of the second cover portion is restricted so as not to be transitioned from the first posture to the second posture.

9. The image forming apparatus according to claim 8, wherein when the opening/closing member is located at the open position, the second cover portion is configured to be transitioned from the first posture to the second posture with respect to the first cover portion by an external force being applied to the second cover portion.

10. The image forming apparatus according to claim 7, wherein when the opening/closing member is located at the closed position, the second cover portion is rotated with respect to the first cover portion in conjunction with a rotation of the first cover portion in the first rotation direction so that the second cover portion is transitioned from the first posture to the second posture with respect to the first cover portion.

11. The image forming apparatus according to claim 10, wherein the second cover portion of the opening/closing member is connected to the housing by a link.

* * * * *